(12) United States Patent
Lee et al.

(10) Patent No.: US 11,513,555 B2
(45) Date of Patent: Nov. 29, 2022

(54) DISPLAY APPARATUS

(71) Applicant: Samsung Display Co., Ltd., Yongin-si (KR)

(72) Inventors: Seokchan Lee, Yongin-si (KR); Dongwoo Seo, Yongin-si (KR); Sojeong La, Yongin-si (KR); Dongjin Park, Yongin-si (KR); Jaiku Shin, Yongin-si (KR); Jihye Shin, Yongin-si (KR); Sungchul Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/204,242

(22) Filed: Mar. 17, 2021

(65) Prior Publication Data
US 2022/0075411 A1    Mar. 10, 2022

(30) Foreign Application Priority Data
Sep. 4, 2020    (KR) .................... 10-2020-0113218

(51) Int. Cl.
*G06F 1/16*    (2006.01)

(52) U.S. Cl.
CPC .......... *G06F 1/1616* (2013.01); *G06F 1/1643* (2013.01)

(58) Field of Classification Search
CPC combination set(s) only.
See application file for complete search history.

(56) References Cited

U.S. PATENT DOCUMENTS

| 10,394,371 | B2 | 8/2019 | Kim et al. | |
| 10,495,941 | B2 | 12/2019 | Hashimoto et al. | |
| 10,586,941 | B2 | 3/2020 | Lee et al. | |
| 10,592,051 | B1 * | 3/2020 | Yildiz | G06F 1/1694 |
| 10,976,873 | B2 * | 4/2021 | Shin | H04M 1/0216 |
| 11,191,195 | B2 * | 11/2021 | Baek | H04M 1/0216 |
| 11,275,404 | B2 * | 3/2022 | Bae | G06F 3/04162 |
| 2020/0137900 | A1 | 4/2020 | Park et al. | |
| 2020/0209998 | A1 * | 7/2020 | Shin | H04M 1/0268 |
| 2020/0236826 | A1 * | 7/2020 | Baek | H05K 5/0017 |
| 2020/0401275 | A1 * | 12/2020 | Shin | G06F 3/0445 |
| 2021/0034180 | A1 * | 2/2021 | Hirotsugu | G06F 3/046 |
| 2021/0173437 | A1 * | 6/2021 | Bae | G06F 1/1616 |
| 2021/0208709 | A1 * | 7/2021 | Shin | G06F 3/044 |
| 2021/0333944 | A1 * | 10/2021 | Jung | G06F 3/0446 |
| 2022/0011819 | A1 * | 1/2022 | Shin | G06F 1/1643 |
| 2022/0043538 | A1 * | 2/2022 | Kishimoto | G06F 3/0443 |
| 2022/0044599 | A1 * | 2/2022 | La | G06F 1/1616 |
| 2022/0061169 | A1 * | 2/2022 | Shin | G06F 1/1641 |

FOREIGN PATENT DOCUMENTS

| KR | 10-2017-0077670 | 7/2017 |
| KR | 10-2017-0084402 | 7/2017 |
| KR | 10-2020-0084495 | 7/2020 |
| KR | 10-2020-0090476 | 7/2020 |

* cited by examiner

*Primary Examiner* — Lisa Lea-Edmonds
(74) *Attorney, Agent, or Firm* — Kile Park Reed & Houtteman PLLC

(57) ABSTRACT

A display apparatus includes a display area and a folding area; a display panel; a digitizer disposed below the display panel; a sagging prevention member disposed in a portion below the display panel overlapping the folding area; and a lower cover disposed below the sagging prevention member.

32 Claims, 11 Drawing Sheets

DISPLAY APPARATUS

CROSS-REFERENCE TO RELATED APPLICATION(S)

This application claims priority to and benefits of Korean Patent Application No. 10-2020-0113218 under 35 U.S.C. § 119, filed on Sep. 4, 2020, in the Korean Intellectual Property Office, the entire contents of which are incorporated herein by reference.

BACKGROUND

1. Technical Field

One or more embodiments relate to a display apparatus, and, to a foldable display apparatus.

2. Description of the Related Art

Mobility-based electronic devices are widely used. As examples of such mobile electronic devices, tablet PCs, in addition to compact electronic devices such as mobile phones, are widely used.

These mobile electronic devices may include a display apparatus that supports various functions and provides visual information such as images or pictures to users. Recently, as sizes of components for driving a display apparatus have been reduced, a ratio of a display apparatus in an electronic device has gradually increased, and a display apparatus with a structure that is foldable to a certain angle in a flat state has been developed.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

One or more embodiments include a display apparatus including a digitizer for inputting an external signal to provide users with various input methods using a pen or the like within the spirit and the scope of the disclosure. However, these objectives are just examples, and the scope of the disclosure is not limited thereby.

Additional aspects will be set forth in part in the description which follows and, in part, will be apparent from the description, or may be learned by practice of the disclosure.

According to one or more embodiments, a display may include a display area and a folding area; a display panel; a digitizer disposed below the display panel; a sagging prevention member disposed in a portion below the display panel overlapping the folding area; and a lower cover disposed below the sagging prevention member.

The display area may include a first display area and a second display area spaced apart from each other, the folding area may be disposed between the first display area and the second display area, and the digitizer may include a first digitizer overlapping the first display area; a second digitizer overlapping the second display area; and a third digitizer overlapping the folding area.

The first digitizer and the second digitizer may be spaced apart from each other.

The third digitizer may be disposed between the first digitizer and the second digitizer.

The third digitizer may be spaced apart from each of the first digitizer and the second digitizer.

The third digitizer may be disposed above the sagging prevention member.

The display apparatus may further include a plate disposed between the display panel and the digitizer.

The plate may include a first portion overlapping the first display area and the second display area; and a second portion overlapping the folding area.

The first portion of the plate may include a non-metallic material, and the second portion of the plate may include a metallic material.

The display apparatus may further include a folding structure disposed in the second portion of the plate.

The display apparatus may further include an electromagnetic wave absorption layer disposed below the digitizer.

The electromagnetic wave absorption layer may include a first electromagnetic wave absorption layer overlapping the first display area; a second electromagnetic wave absorption layer overlapping the second display area; and a third electromagnetic wave absorption layer overlapping the folding area.

The first electromagnetic wave absorption layer, the second electromagnetic wave absorption layer, and the third electromagnetic wave absorption layer may be spaced apart from one another.

The third electromagnetic wave absorption layer may be disposed between the sagging prevention member and the third digitizer.

The display apparatus may further include a wing plate disposed below the electromagnetic wave absorption layer.

The wing plate may include a first wing plate overlapping the first display area; and a second wing plate overlapping the second display area.

The first wing plate and the second wing plate may be spaced apart from each other.

The sagging prevention member may be disposed between the first wing plate and the second wing plate.

The display apparatus may further include an optical functional layer disposed above the display panel.

According to one or more embodiments, a display apparatus may include including a display area and a folding area; a display panel; a plate disposed below the display panel and including a first portion overlapping the display area; and a second portion overlapping the folding area; a digitizer disposed below the plate; and a sagging prevention member disposed below the plate overlapping the folding area.

The first portion of the plate and the second portion of the plate may include different materials.

The display area may include a first display area and a second display area spaced apart from each other, the folding area may be disposed between the first display area and the second display area, and the digitizer may include a first digitizer overlapping the first display area; a second digitizer overlapping the second display area; and a third digitizer overlapping the folding area.

The first digitizer and the second digitizer may overlap the first portion of the plate, and the third digitizer may be overlap the second portion of the plate.

The third digitizer may be disposed above the sagging prevention member.

The display apparatus may further include a wing plate disposed below the digitizer, wherein the wing plate may include a first wing plate overlapping the first display area; and a second wing plate overlapping the second display area.

The first wing plate and the second wing plate may be spaced apart from each other.

The sagging prevention member may be disposed between the first wing plate and the second wing plate.

The display apparatus may further include a cushion layer disposed above the wing plate, wherein the cushion layer may include a first cushion layer overlapping the first display area; and a second cushion layer overlapping the second display area.

The first cushion layer and the second cushion layer may be spaced apart from each other.

The sagging prevention member may be disposed between the first cushion layer and the second cushion layer.

Other aspects, features, and advantages other than those described above will become apparent from the accompanying drawings, the appended claims, and the detailed description of the disclosure.

BRIEF DESCRIPTION OF THE DRAWINGS

The above and other aspects, features, and advantages of the disclosure will be more apparent from the following description taken in conjunction with the accompanying drawings, in which.

DETAILED DESCRIPTION OF THE EMBODIMENTS

Figure 1:
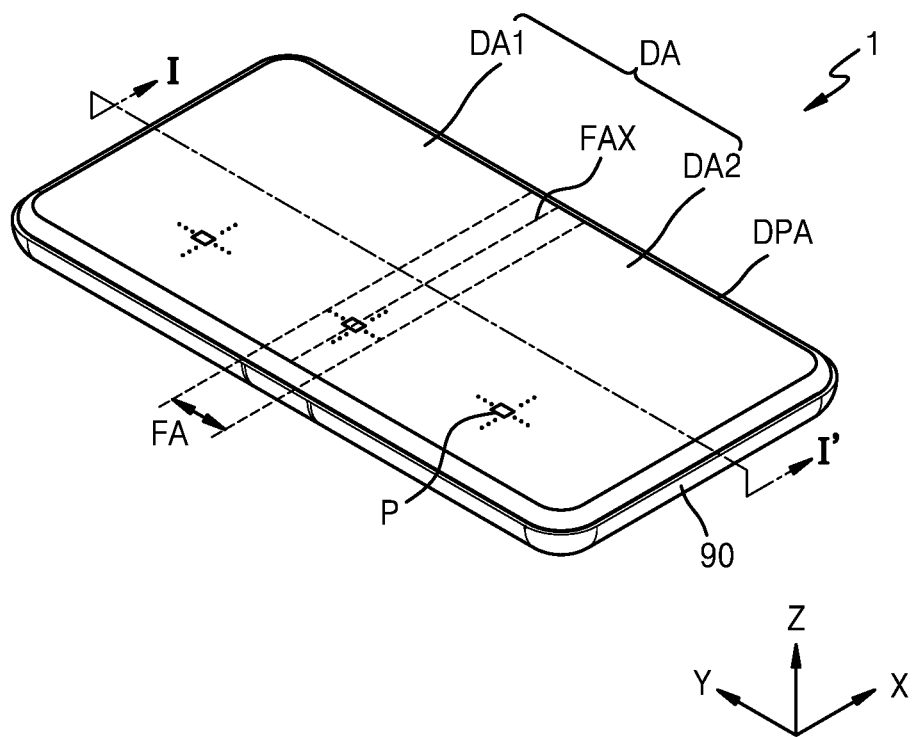
FIG. 1 is a perspective view of a display apparatus according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, the embodiments are merely described below, by referring to the figures, to explain aspects of the description. As used herein, the term "and/or" includes any and all combinations of one or more of the associated listed items. Throughout the disclosure, the expression "at least one of a, b, and c" indicates only a, only b, only c, both a and b, both a and c, both b and c, all of a, b, and c, or variations thereof.

Since the disclosure may have various modifications and several embodiments, embodiments are shown in the drawings and will be described in detail. Effects, features, and a method of achieving the same will be described with reference to the embodiments described below in detail together with the attached drawings. However, the embodiments may have different forms and should not be construed as being limited to the descriptions set forth herein.

While such terms as "first," "second," etc., may be used to describe various components, such components must not be limited to the above terms. The above terms are used only to distinguish one component from another.

An expression used in the singular encompasses the expression of the plural unless it has a clearly different meaning in the context.

In the specification, it is to be understood that the terms such as "comprising" or "including" or "having" and their variations are intended to indicate the existence of the features or components disclosed in the specification, and are not intended to preclude the possibility that one or more other features or components may be added.

It will be understood that when a layer, region, or component is referred to as being "formed on" or "disposed on" or "arranged on" or "located on" or "provided on" another layer, region, or component, it may be directly or indirectly formed or disposed on or arranged on or located on or provided on the other layer, region, or component. That is, for example, intervening layers, regions, or components may be present.

Sizes of components in the drawings may be exaggerated for convenience of explanation. For example, since sizes and thicknesses of components in the drawings are arbitrarily illustrated for convenience of explanation, the following embodiments are not limited thereto.

In the following embodiments, the expression that a line "extending in a first direction or a second direction" includes not only a line extending in a linear form but also extending in a substantially zigzag or substantially curved shape in the first or second direction.

In the following embodiments, the expression "in a plan view" indicates that an object is viewed from above, and the expression "on a schematic cross-section" indicates that a cross-sectional of the object cut vertically is viewed from a side.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

The embodiments will be described below in more detail with reference to the accompanying drawings. Those components that are the same or are in correspondence are rendered the same reference numeral regardless of the figure number.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
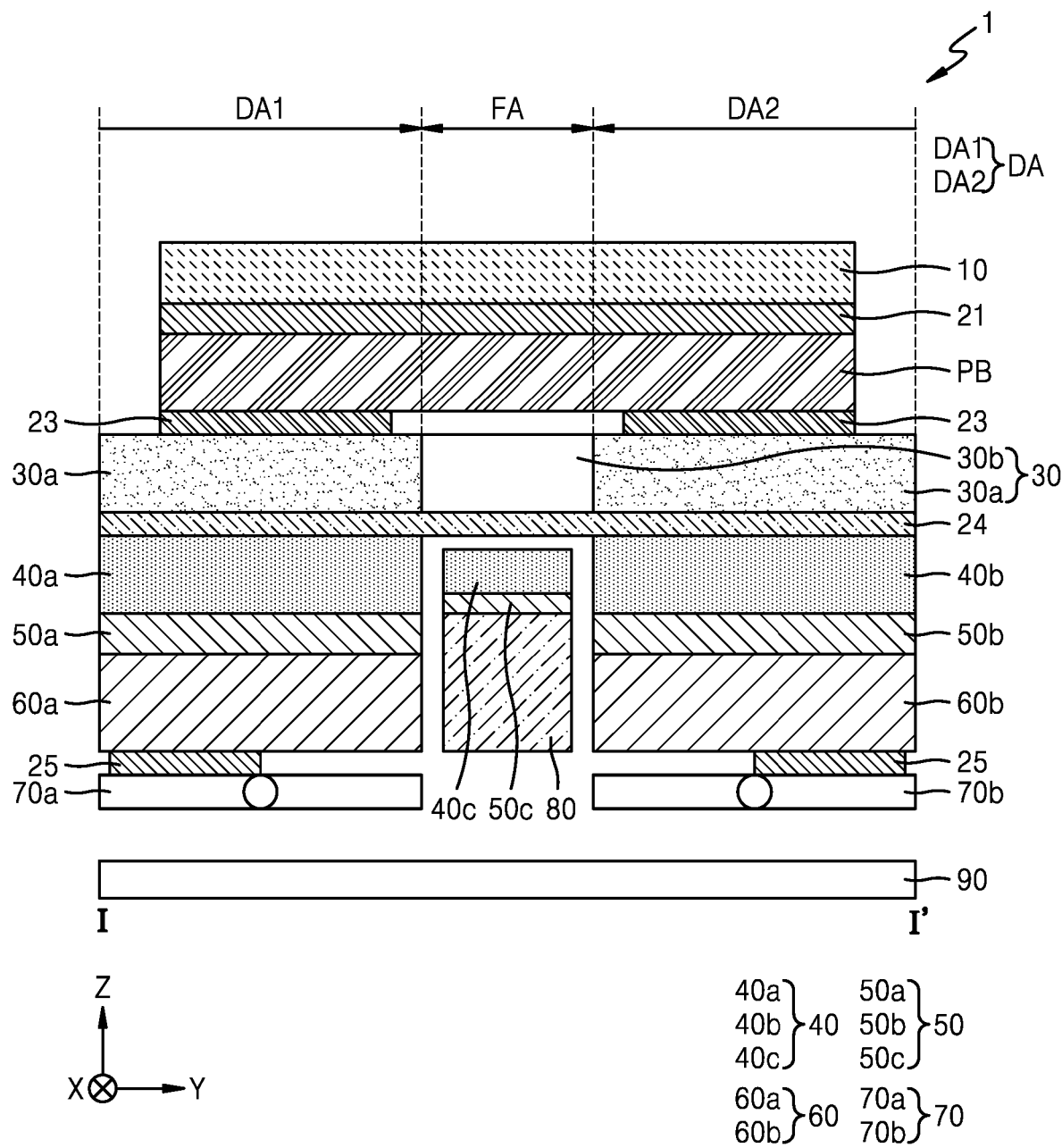
FIG. 2 is a schematic cross-sectional view of the display apparatus taken along line I-I' of FIG. 1.

FIG. 1 is a perspective view of a display apparatus according to an embodiment, and FIG. 2 is a schematic cross-sectional view of the display apparatus taken along line I-I' of FIG. 1.

Referring to FIGS. 1 and 2, a display apparatus 1 is an apparatus for displaying a moving image or images or a still image or still images, and may be used not only as a display screen of portable electronic devices such as a mobile phone, a smartphone, a tablet personal computer (PC), a mobile communication terminal, a personal digital assistant (PDA), an electronic book, a portable multimedia player (PMP), a navigation device, or a ultra-mobile PC, but also as a display screen of other various products such as TVs, laptop computers, monitors, billboards, internet of things (IoT) or the like within the spirit and the scope of the disclosure.

The display apparatus 1 may be used in a wearable device such as a smartwatch, a watch phone, a glasses-type display, or a head-mounted display (HMD). For example, the display apparatus 1 may be used as a display in an instrument panel of a vehicle and a center information display (CID) arranged or disposed on a center fascia or a dashboard of a vehicle, a room mirror display for replacing side-view mirrors of a vehicle, or a display arranged or disposed on a rear surface of a front seat for providing entertainment content to a passenger in a back seat of a vehicle. In FIGS. 1 and 2, for convenience of description, the display apparatus 1 used as a smartphone is exemplified.

The display apparatus 1 may include a display area DA and a peripheral area DPA outside of, or adjacent to, the display area DA. The display apparatus 1 may include a folding area FA, and the display area DA may include a first display area DA1 and a second display area DA2 that may be spaced apart from each other with the folding area FA therebetween. The peripheral area DPA may be a type of non-display area where no display elements may be arranged or disposed.

In an embodiment, the display area DA and the folding area FA may display an image separately or jointly. In detail, pixels P may be arranged or disposed in the display area DA and the folding area FA. Accordingly, the display apparatus 1 may provide an image by using the pixels P arranged or disposed in the display area DA and the folding area FA.

In the specification, "above" or "in a portion above" refers to a +Z direction with respect to a display panel 10 and "below" or "in a portion below" refers to a −Z direction with respect to the display panel 10.

Also, "left," "right," "up," and "down" denote directions for viewing the display panel 10 from a plane. For example, "left" denotes −X direction, "right" denotes +X direction, "up" denotes +Y direction, and "down" denotes −Y direction.

The display apparatus 1 may be have a substantially planar rectangular shape. For example, the display apparatus 1 may have a substantially planar rectangular shape having a short side in a first direction (X-direction) and a long side in a second direction (Y-direction) as shown in FIG. 1. Corners where the short side in the first direction (X-direction) and the long side in the second direction (Y-direction) meet may be rounded to have a certain or predetermined curvature or may be at a right angle. The substantially planar shape of the display apparatus 1 is not limited to substantially that of a rectangle, and may also be other polygons, an oval, or an amorphous shape.

The display apparatus 1 as described above may be in various shapes. In an embodiment, the display apparatus 1 may be in a non-variable shape. In an embodiment, the display apparatus 1 may have a shape in which at least a portion thereof may be hinged. In this case, the display apparatus 1 may be in an in-folding shape in which the display areas DA of the display panel 10 may face each other in a case that the display apparatus 1 is hinged or in an out-folding shape in which a display area of the display panel 10 is exposed to the outside in a case that the display apparatus 1 is hinged. Hereinafter, for convenience of description, description will focus on the display apparatus 1 in an in-folding shape.

In the above case, the display apparatus 1 may be hinged with respect to a folding axis FAX. In a case that the display apparatus 1 is hinged with respect to the folding axis FAX, a size of the display area DA may decrease, and in a case that the display apparatus 1 is completely unfolded, as the display area DA displays an image while forming a flat surface, a large screen may be realized.

The display panel 10 may be a light-emitting display panel including a light-emitting element. For example, the display panel 10 may be an organic light-emitting display panel using an organic light-emitting diode (OLED) including an organic emission layer, a micro LED display panel using a micro LED, a quantum dot light-emitting display panel using a quantum dot LED including a quantum dot emission layer, or an inorganic light-emitting display panel using an inorganic light-emitting element including an inorganic semiconductor.

The display panel 10 may be a rigid display panel that may be rigid and thus not easily bent or a flexible display panel that may be flexible and easily bent, folded or rolled. For example, the display panel 10 may be a foldable display panel, a curved display panel having a substantially curved display surface, a bent display panel having areas substantially curved except for a display surface, a rollable display panel that may be rollable or unrollable, and a stretchable display panel.

The display panel 10 may be a transparent display panel that may be transparent such that an object or a background on a lower surface of the display panel 10 may be viewed from an upper surface of the display panel 10. Alternatively, the display panel 10 may be a reflective display panel capable of reflecting an object or background on the upper surface of the display panel 10.

A lower cover 90 may be arranged or disposed below the display panel 10. The lower cover 90 may form an outer appearance of the display apparatus 1. The lower cover 90 may include a plastic, a metal or both a plastic and a metal.

A panel protection member PB may be arranged or disposed below the display panel 10. The panel protection member PB may be attached below the display panel 10 to support and protect the display panel 10. The panel protection member PB may include polyethylene terephthalate (PET) or polyimide (PI).

In an embodiment, the panel protection member PB may be attached below the display panel 10 via a first adhesive layer 21. The first adhesive layer 21 may be a pressure-sensitive adhesive (PSA).

Figure 3:
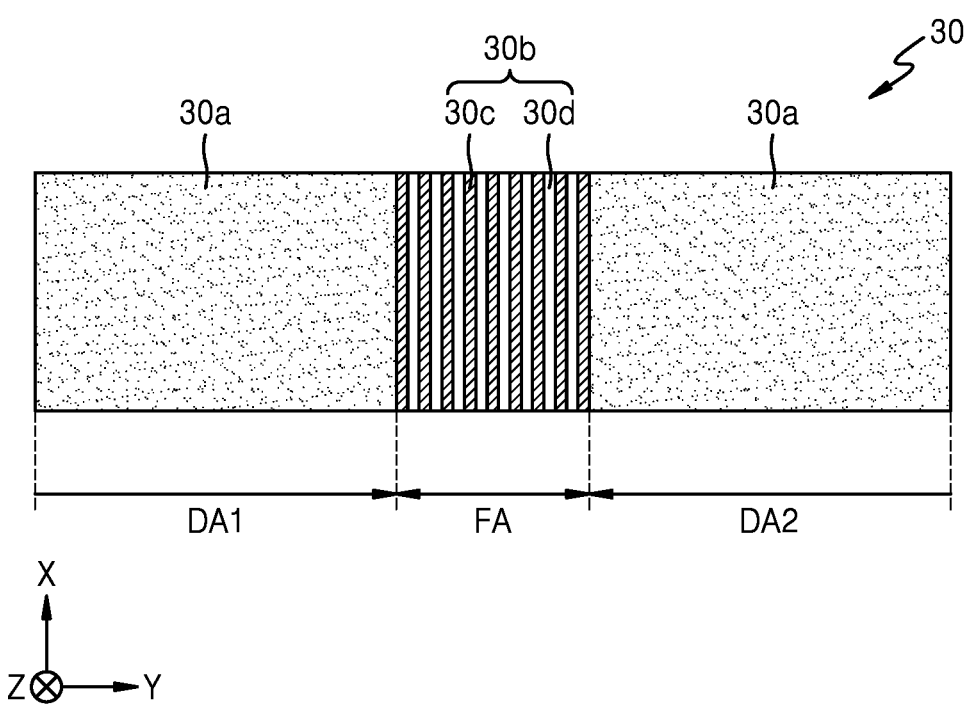
FIG. 3 is a plan view schematically illustrating a plate included in a display apparatus according to an embodiment.

FIG. 3 is a plan view schematically illustrating a plate included in a display apparatus according to an embodiment.

Referring to FIGS. 2 and 3, a plate 30 may be arranged or disposed below the panel protection member PB. The plate 30 may include a first portion 30a corresponding to the first display area DA1 and the second display area DA2 and a second portion 30b corresponding to the folding area FA. In an embodiment, the first portion 30a of the plate 30 may at least partially overlap the first display area DA1 and the second display area DA2, and the second portion 30b of the plate 30 may at least partially overlap the folding area FA.

As will be described later, a digitizer 40 may be arranged or disposed below the plate 30. The digitizer 40 may be attached below the plate 30 via a third adhesive layer 24. The third adhesive layer 24 may be a PSA. In an embodiment, the third adhesive layer 24 may be arranged or disposed not only in a portion corresponding to the first portion 30a of the plate 30, to which the digitizer 40 may be attached, but also in a portion corresponding to the folding area FA. For example, the third adhesive layer 24 may be formed as a single body corresponding to the display area DA and the folding area FA. Accordingly, it may also be seen that the first portion 30a and the second portion 30b of the plate 30 may be formed or disposed on the third adhesive layer 24.

In an embodiment, the first portion 30a and the second portion 30b of the plate 30 may include different materials. The first portion 30a of the plate 30 may include a non-metallic material. For example, the first portion 30a of the plate 30 may include glass, a polymer resin, or the like within the spirit and the scope of the disclosure. As the first portion 30a of the plate 30 may include a non-metallic material, an input signal or the like may be precisely input.

In an embodiment, the second portion 30b of the plate 30 may correspond to the folding area FA and include a metallic material.

The second portion 30b of the plate 30 may be arranged or disposed to correspond to (overlap) the folding area FA, and thus, the second portion 30b of the plate 30 may be a portion that may be folded in a case that the display apparatus 1 is folded. As the second portion 30b of the plate 30 may include a metallic material, the second portion 30b of the plate 30 may be easily folded.

In an embodiment, the second portion 30b of the plate 30 may include a folding structure. The folding structure may include portions 30c where a metallic material may be arranged or disposed and openings 30d between the portions 30c. As the folding structure included in the second portion 30b of the plate 30 is included as the portions 30c where a metallic material may be arranged or disposed and the opening 30d between the portions 30c where the metallic material may be arranged or disposed, the second portion 30b of the plate 30 may be easily folded.

In an embodiment, the folding structure included in the second portion 30b of the plate 30 may be in the form of a substantially uneven structure, rotatably connected links, or the like within the spirit and the scope of the disclosure.

In an embodiment, the plate 30 may be attached or disposed below the panel protection member PB via a second adhesive layer 23. The second adhesive layer 23 may be a PSA.

Figure 4:
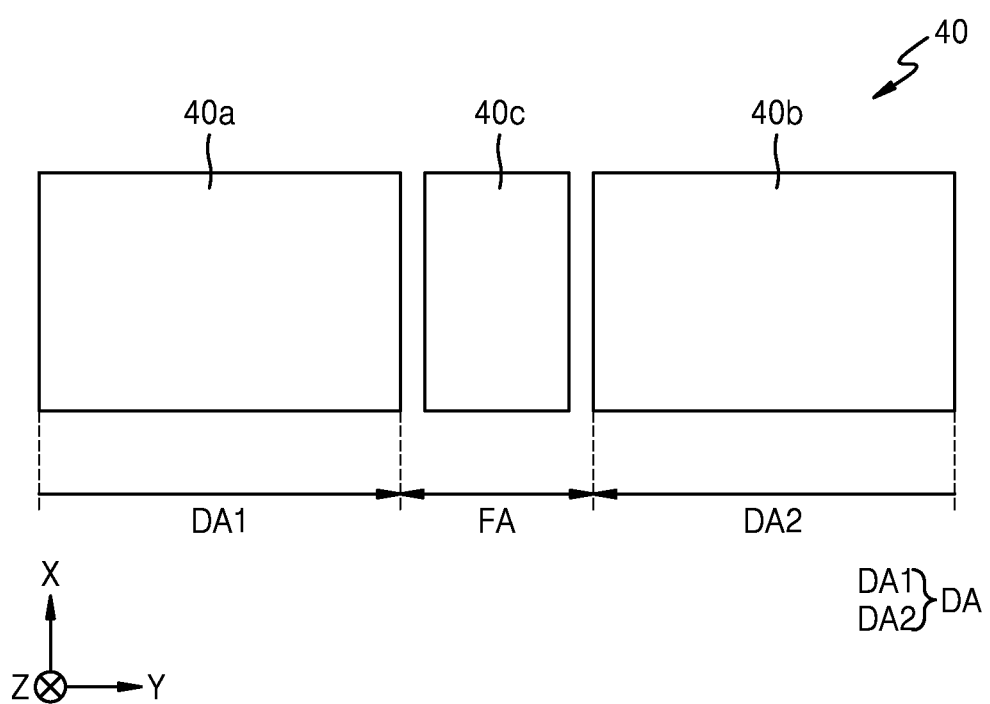
FIG. 4 is a plan view schematically illustrating a digitizer included in a display apparatus according to an embodiment.
Figure 5:
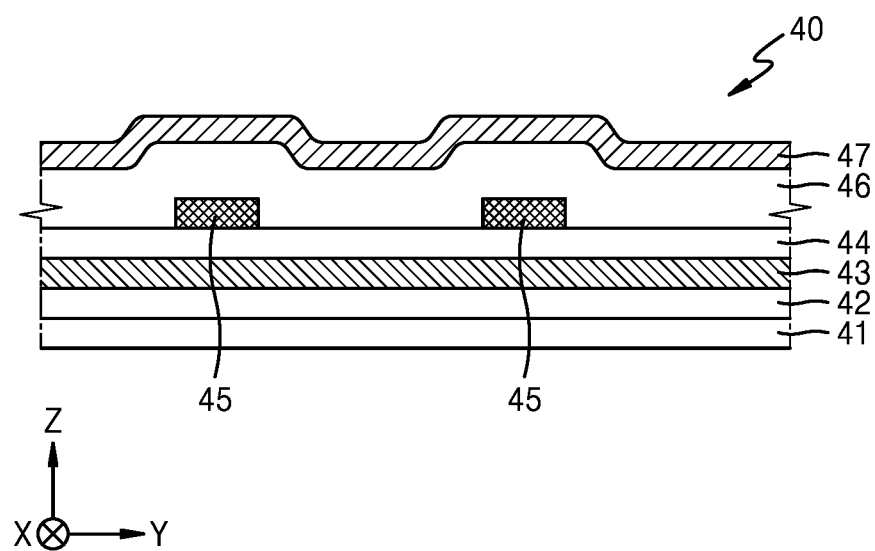
FIG. 5 is a schematic cross-sectional view schematically illustrating a digitizer included in a display apparatus according to an embodiment.

FIG. 4 is a plan view schematically illustrating a digitizer included in a display apparatus according to an embodiment, and FIG. 5 is a schematic cross-sectional view schematically illustrating a digitizer included in a display apparatus according to an embodiment.

Referring to FIGS. 2, 4, and 5, the digitizer 40 may be arranged or disposed below the plate 30. The digitizer 40 may include a first digitizer 40a corresponding to the first display area DA1, a second digitizer 40b corresponding to the second display area DA2, and a third digitizer 40c corresponding to the folding area FA.

The first digitizer 40a may at least partially overlap the first display area DA1, the second digitizer 40b may at least partially overlap the second display area DA2, and the third digitizer 40c may at least partially overlap the folding area FA.

The first digitizer 40a may be arranged or disposed below the plate 30 to correspond to (overlap) the first display area DA1, the second digitizer 40b may be arranged or disposed below the plate 30 to correspond to (overlap) the second display area DA2, and the third digitizer 40c may be arranged or disposed below the plate 30 to correspond to (overlap) the folding area FA. The first digitizer 40a and the second digitizer 40b may be arranged or disposed below the first portion 30a of the plate 30, and the third digitizer 40c may be arranged or disposed below the second portion 30b of the plate 30.

In an embodiment, the first digitizer 40a and the second digitizer 40b may be spaced apart from each other by a certain or predetermined distance, and the third digitizer 40c may be arranged (located or disposed) between the first digitizer 40a and the second digitizer 40b. The third digitizer 40c may be spaced apart from each of the first digitizer 40a and the second digitizer 40b by a certain or predetermined distance.

In an embodiment, the first digitizer 40a and the second digitizer 40b may be formed as a single body, and an opening or a hole may be defined or formed in the first digitizer 40a and the second digitizer 40b that may be formed as a single body. The third digitizer 40c may be arranged or disposed in the opening or hole defined or formed in the first digitizer 40a and the second digitizer 40b.

As will be described later, the third digitizer 40c may be arranged or disposed above a sagging prevention member 80 included in the folding area FA. As the third digitizer 40c is spaced apart from the first digitizer 40a and the second digitizer 40b and arranged or disposed above the sagging prevention member 80 in the folding area FA, a digitizer (for example, the third digitizer 40c) may also be arranged or disposed in the folding area FA, and thus, various input methods using a pen or the like may be provided to users. The sagging prevention member 80 may also be referred to as a deformation prevention member or a distortion prevention member.

In an embodiment, a thickness of the first digitizer 40a may be different from that of the third digitizer 40c. In an embodiment, a thickness of the first digitizer 40a may be equal to a thickness of the third digitizer 40c.

The digitizer 40 may include a first layer 41, a first pattern layer 43, a second layer 44, a second pattern layer 45, and a third layer 47. In an embodiment, the first pattern layer 43 and the second pattern layer 45 may be arranged or disposed on different surfaces of the second layer 44. In an embodiment, the first pattern layer 43 and the second pattern layer 45 may be stacked on each other. In this case, the first pattern layer 43 and the second pattern layer 45 may be stacked in different layers from each other. Hereinafter, for convenience of description, description will focus on a case where the first pattern layer 43 and the second pattern layer 45 of the digitizer 40 are arranged or disposed on different surfaces of the second layer 44.

The first pattern layer 43 may be arranged or disposed on a lower surface of (under or below) the second layer 44, and the second pattern layer 45 may be arranged or disposed on an upper surface (on) the second layer 44. The first pattern layer 43 may directly contact the lower surface of the second layer 44, and the second pattern layer 45 may directly contact the upper surface of the second layer 44. The first pattern layer 43 and the second pattern layer 45 may be formed by respectively forming a pattern layer on each of the lower surface and the upper surface of the second layer 44 and leaving a portion of the pattern layer and removing another portion of the pattern layer.

The first pattern layer 43 and the second pattern layer 45 may be in the form of a loop coil. An induction current may be induced in the first pattern layer 43 and the second pattern layer 45 as a stylus contacts or hovers over the display apparatus, and thus, the first pattern layer 43 and the second pattern layer 45 may be used to detect a position of the stylus. Here, the first pattern layer 43 and the second pattern layer 45 may be arranged or disposed in different directions from each other. For example, in a case that the second pattern layer 45 may be arranged or disposed in one of the first direction (X-direction) or the second direction (Y-direction), the first pattern layer 43 may be arranged or disposed in the other of the first direction (X-direction) or the second direction (Y-direction). For example, in a case that the second pattern layer 45 may be arranged or disposed in the first direction (X-direction), the first pattern layer 43 may be arranged or disposed in the second direction (Y-direction), and in a case that the second pattern layer 45 may be arranged or disposed in the second direction (Y-direction), the first pattern layer 43 may be arranged or disposed in the first direction (X-direction). In this case, the first pattern layer 43 and the second pattern layer 45 may be arranged or disposed to cross or intersect each other.

The first layer 41 may be arranged or disposed below the first pattern layer 43, and the third layer 47 may be arranged or disposed above the second pattern layer 45. As the first layer 41 and the third layer 47 respectively shield the first pattern layer 43 and the second pattern layer 45, exposure of the first pattern layer 43 and the second pattern layer 45 to the external moisture or oxygen and oxidization thereof may be prevented.

In an embodiment, the first layer 41 and the third layer 47 may include a PI resin. In an embodiment, the first layer 41 and the third layer 47 may include a PI resin and a light-absorbing material such as at least one of a black pigment, a black dye, and a black filler.

A fourth adhesive layer 42 may be disposed between the first layer 41 and the first pattern layer 43. In an embodiment, the fourth adhesive layer 42 may be formed as a single body with the first layer 41. The fourth adhesive layer 42 may be a PSA.

A fifth adhesive layer 46 may be disposed between the third layer 47 and the second pattern layer 45. In an embodiment, the fifth adhesive layer 46 may be formed as a single body with the third layer 47. The fifth adhesive layer 46 may be a PSA.

In an embodiment, the first layer 41 and the third layer 47 may include a same or similar material as that of the second layer 44. For example, the second layer 44 may include a PI resin.

Referring back to FIG. 2, an electromagnetic wave absorbing layer 50 may be arranged or disposed under or below the digitizer 40. The electromagnetic wave absorbing layer 50 may include a first electromagnetic wave absorbing layer 50a corresponding to the first display area DA1, a second electromagnetic wave absorbing layer 50b corresponding to the second display area DA2, and a third electromagnetic wave absorbing layer 50c corresponding to the folding area FA.

The first electromagnetic wave absorbing layer 50a may at least partially overlap the first display area DA1, the second electromagnetic wave absorbing layer 50b may at least partially overlap the second display area DA2, and the third electromagnetic wave absorbing layer 50c may at least partially overlap the folding area FA.

The first electromagnetic wave absorbing layer 50a may be arranged or disposed under or below the first digitizer 40a to correspond to (overlap) the first display area DA1, the second electromagnetic wave absorbing layer 50b may be arranged or disposed under or below the second digitizer 40b to correspond to (overlap) the second display area DA2, and the third electromagnetic wave absorbing layer 50c may be arranged or disposed under or below the third digitizer 40c to correspond to (overlap) the folding area FA.

In an embodiment, the first electromagnetic wave absorbing layer 50a and the second electromagnetic wave absorbing layer 50b may be spaced apart from each other by a certain or predetermined distance. The third electromagnetic wave absorbing layer 50c may be arranged (located or disposed) between the first electromagnetic wave absorbing layer 50a and the second electromagnetic wave absorbing layer 50b. The third electromagnetic wave absorbing layer 50c may be apart from each of the first electromagnetic wave absorbing layer 50a and the second electromagnetic wave absorbing layer 50b by a certain or predetermined distance.

In an embodiment, the first electromagnetic wave absorbing layer 50a and the second electromagnetic wave absorbing layer 50b may be formed as a single body, and an opening or a hole may be defined or formed in the first electromagnetic wave absorbing layer 50a and the second electromagnetic wave absorbing layer 50b that may be formed as a single body. In this case, the third electromagnetic wave absorbing layer 50c may be arranged or disposed in the opening or hole defined or formed in the first electromagnetic wave absorbing layer 50a and the second electromagnetic wave absorbing layer 50b.

The electromagnetic wave absorbing layer 50 may include a magnetic metal powder (MMP). As the electromagnetic wave absorbing layer 50 may include an MMP, the electromagnetic wave absorbing layer 50 may absorb an electromagnetic wave incident to the digitizer 40 or an electromagnetic wave emitted from the digitizer 40.

In an embodiment, the first electromagnetic wave absorbing layer 50a, the second electromagnetic wave absorbing layer 50b, and the third electromagnetic wave absorbing layer 50c may be respectively arranged or disposed to correspond to (overlap) the first digitizer 40a, the second digitizer 40b, and the third digitizer 40c, and accordingly, the first electromagnetic wave absorbing layer 50a, the second electromagnetic wave absorbing layer 50b, and the third electromagnetic wave absorbing layer 50c may respectively absorb an electromagnetic wave incident to or emitted from the first digitizer 40a, the second digitizer 40b, and the third digitizer 40c.

A cushion layer 60 may be arranged or disposed under or below the electromagnetic wave absorbing layer 50. The cushion layer 60 may include a first cushion layer 60a arranged or disposed to correspond to the first display area DA1 and a second cushion layer 60b arranged or disposed to correspond to the second display area DA2. The first cushion layer 60a and the second cushion layer 60b may be spaced apart from each other by a certain or predetermined distance. The sagging prevention member 80 may be disposed between the first cushion layer 60a and the second cushion layer 60b.

In an embodiment, the first cushion layer 60a and the second cushion layer 60b may be formed as a single body, and an opening or a hole may be defined or formed in the first cushion layer 60a and the second cushion layer 60b.

The cushion layer 60 may absorb impact from the outside to protect the display panel 10.

A wing plate 70 may be arranged or disposed below the cushion layer 60. The wing plate 70 may include a first wing plate 70a arranged or disposed to correspond to the first display area DA1 and a second wing plate 70b arranged or disposed to correspond to the second display area DA2. The first wing plate 70a may be arranged or disposed below the first cushion layer 60a, and the second wing plate 70b may be arranged or disposed below the second cushion layer 60b. An adhesive layer 25 may be disposed between the first cushion layer 60a and the first wing plate 70a and between the second cushion layer 60b and the second wing plate 70b. The adhesive layer 25 may not entirely cover or overlap the first cushion layer 60a and the first wing plate 70a and the second cushion layer 60b and the second wing plate 70b.

In an embodiment, the first wing plate 70a and the second wing plate 70b may be spaced apart from each other by a certain or predetermined distance.

In an embodiment, the sagging prevention member 80 may be arranged or disposed between the first digitizer 40a and the second digitizer 40b that may be spaced apart from each other by a certain or predetermined distance, between the first electromagnetic wave absorbing layer 50a and the second electromagnetic wave absorbing layer 50b that may be spaced apart from each other by a certain or predetermined distance, between the first cushion layer 60a and the second cushion layer 60b that may be apart from each other by a certain or predetermined distance, and disposed between the first wing plate 70a and the second wing plate 70b that may be spaced apart from each other by a certain or predetermined distance.

In an embodiment, the sagging prevention member 80 may be arranged or disposed to correspond to the folding area FA. As the sagging prevention member 80 may be arranged or disposed to correspond to the folding area FA, sagging or deforming of components arranged or disposed in the folding area FA (for example, the display panel 10, the plate 30, or the like), in a −Z direction, may be prevented or minimized.

In an embodiment, the third electromagnetic wave absorbing layer 50c and the third digitizer 40c may be arranged or disposed on the sagging prevention member 80. As the third digitizer 40c may be arranged or disposed above the sagging prevention member 80 in the folding area FA, a digitizer may be arranged or disposed below a portion of the display panel 10 corresponding to (overlapping) the folding area FA, and accordingly, various input methods using a pen or the like may be provided to users.

In an embodiment, the lower cover 90 may be arranged or disposed below the sagging prevention member 80. The lower cover 90 may form an outer appearance of a lower surface of the display apparatus 1. The lower cover 90 may cover or overlap side surfaces of the display apparatus 1.

Figure 6:
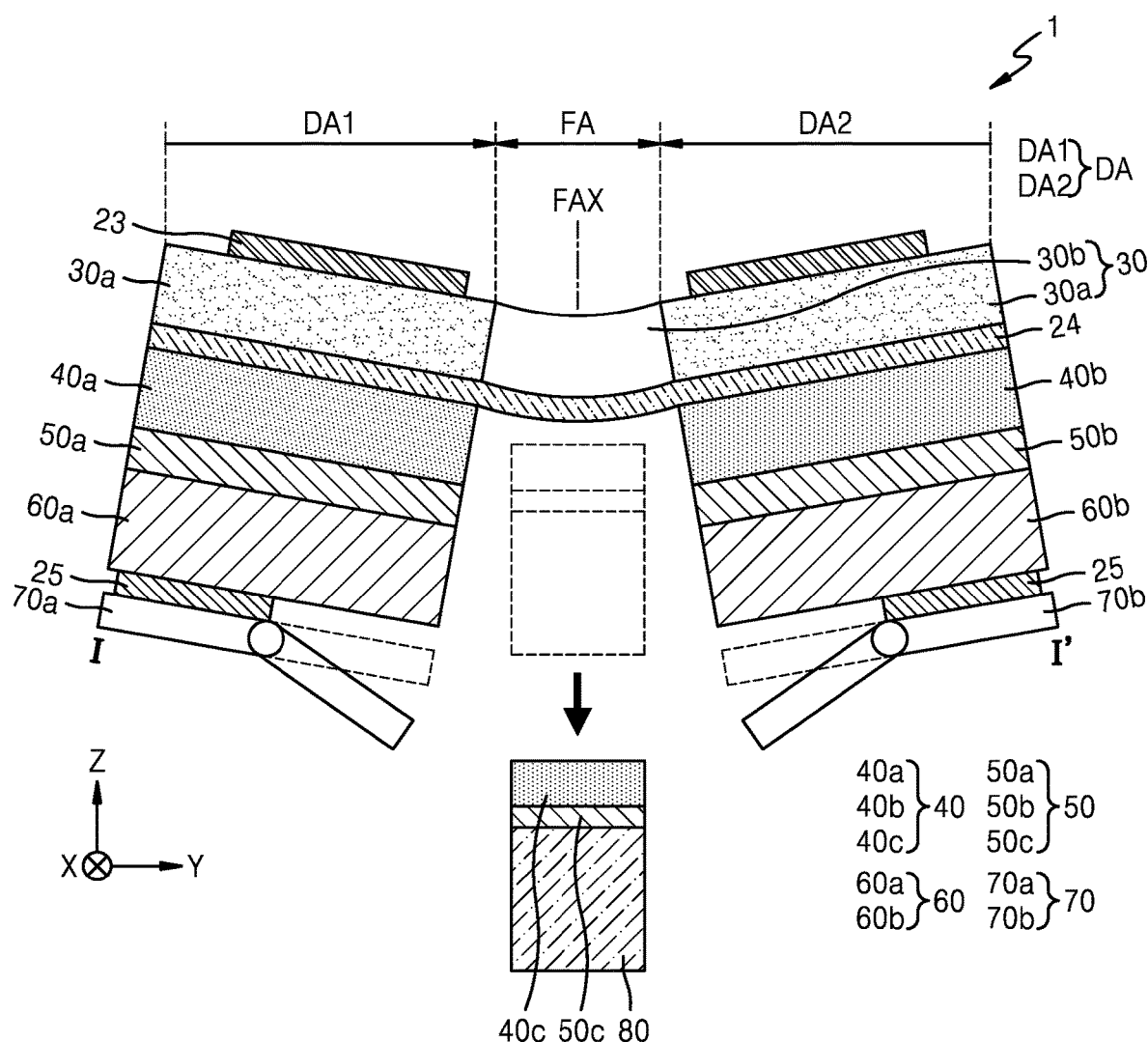
FIG. 6 schematically illustrates positions of a wing plate and a sagging prevention member in a case that a display apparatus according to an embodiment is in-folded.
Figure 7:
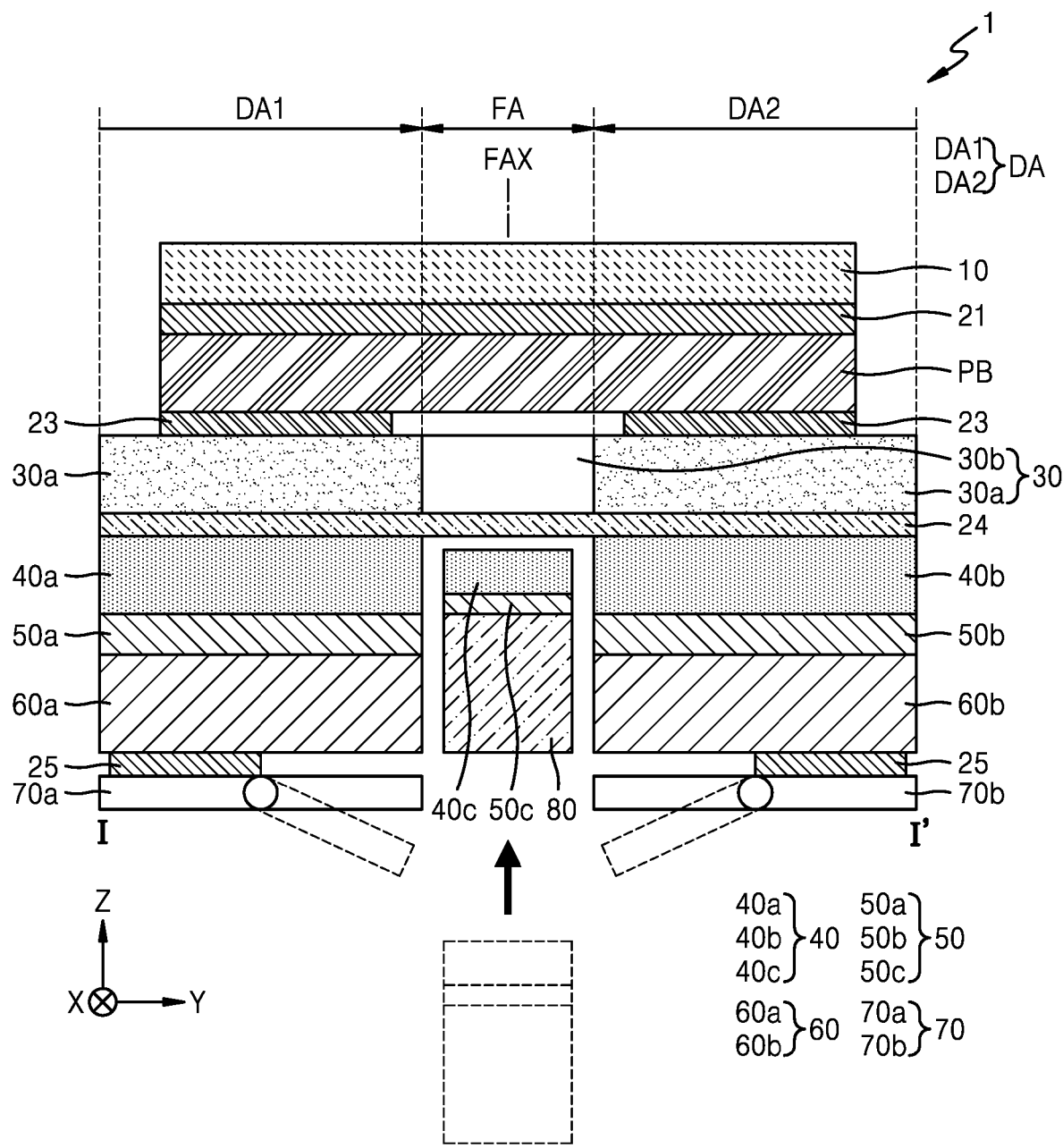
FIG. 7 schematically illustrates positions of a wing plate and a sagging prevention member in a case that a display apparatus according to an embodiment is unfolded.

FIG. 6 schematically illustrates positions of a wing plate and a sagging prevention member in a case that a display apparatus according to an embodiment is in-folded. FIG. 7 schematically illustrates positions of a wing plate and a sagging prevention member in a case that a display apparatus according to an embodiment is unfolded.

Referring to FIGS. 2, 6, and 7, in an embodiment, in a case that the display apparatus 1 is in-folded in a +Z direction, a portion of the wing plate 70 that may be adjacent to the folding area FA and the sagging prevention member 80 may be moved in a −Z direction. In detail, in a case that the display apparatus 1 is in-folded in a +Z direction, a right portion of the first wing plate 70a and a left portion of the second wing plate 70b that may be adjacent to the folding area FA may be moved in a −Z direction, and the sagging prevention member 80 between the first wing plate 70a and the second wing plate 70b may be moved in a −Z direction.

In an embodiment, in a case that the display apparatus 1 is in-folded in a +Z direction, instead of the wing plate 70 and the sagging prevention member 80 moving in a −Z direction, the display panel 10 may be moved in a +Z direction.

In an embodiment, in a case that the display apparatus 1 is unfolded, a portion of the wing plate 70 that may be adjacent to the folding area FA and the sagging prevention member 80 may be moved in a +Z direction. In detail, in a case that the display apparatus 1 is unfolded, the right portion of the first wing plate 70a and the left portion of the second wing plate 70b that may be adjacent to the folding area FA may be moved in a +Z direction, and the sagging prevention member 80 between the first wing plate 70a and the second wing plate 70b may be moved in a +Z direction.

In an embodiment, the third digitizer 40c may be arranged or disposed above the sagging prevention member 80. In a case that the display apparatus 1 is unfolded, as the sagging prevention member 80 above which the third digitizer 40c may be arranged or disposed is moved in a +Z direction, the third digitizer 40c may be located or disposed adjacent to the display panel 10, and accordingly, various input methods using a pen or the like may be provided to users.

In an embodiment, in a case that the display apparatus 1 is unfolded, instead of the wing plate 70 and the sagging prevention member 80 moving in a +Z direction, the display panel 10 may be moved in a −Z direction.

Although not illustrated in the drawings, in an embodiment, the sagging prevention member 80 may be arranged or disposed in a portion of the lower cover 90. Alternatively, the sagging prevention member 80 may be connected to a component additionally provided or disposed below the wing plate 70 (for example, a housing).

Figure 8:
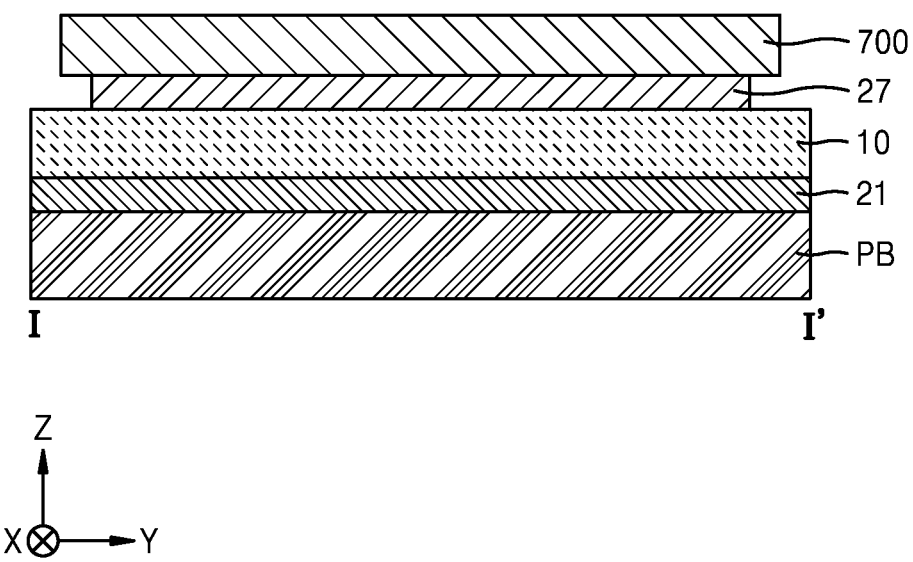
FIG. 8 is a schematic cross-sectional view schematically illustrating a display apparatus according to an embodiment.

FIG. 8 is a schematic cross-sectional view schematically illustrating a display apparatus according to an embodiment.

Referring to FIG. 8, the display apparatus 1 may include the display panel 10, and the panel protection member PB may be arranged or disposed below the display panel 10, and a cover window 700 may be arranged or disposed above the display panel 10.

The panel protection member PB may be attached or disposed below the display panel 10 by using the first adhesive layer 21, and the cover window 700 may be adhered to the display panel 10 by using a sixth adhesive layer 27. The sixth adhesive layer 27 may be a PSA or an optically clear adhesive (OCA).

The cover window 700 may be attached or disposed above the display panel 10 to protect the display panel 10.

Figure 9:
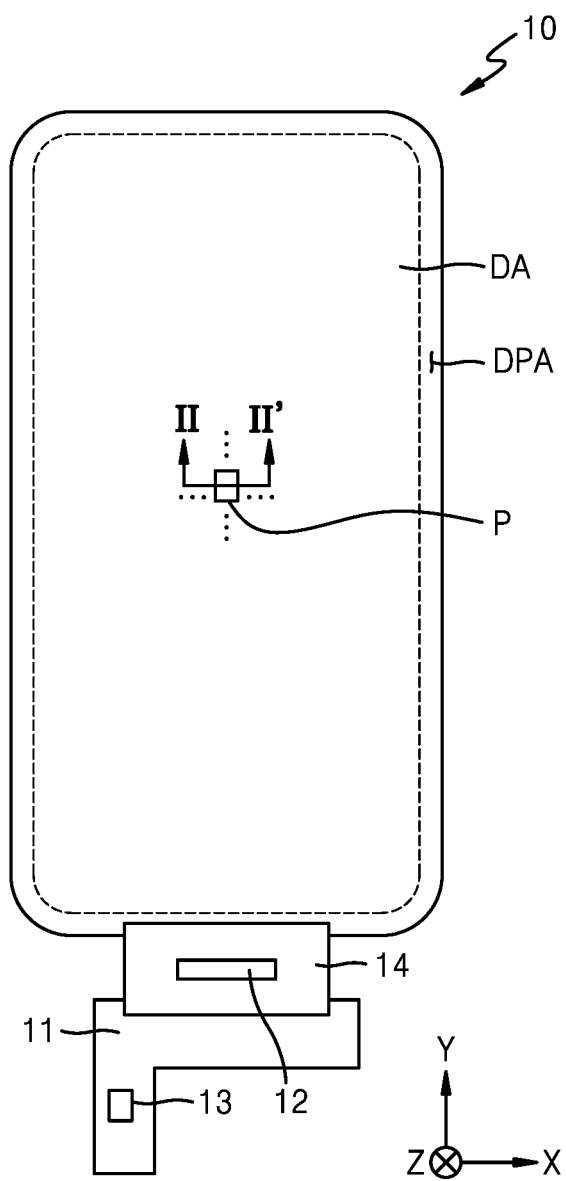
FIG. 9 is a plan view schematically illustrating a display panel included in a display apparatus according to an embodiment.
Figure 10:
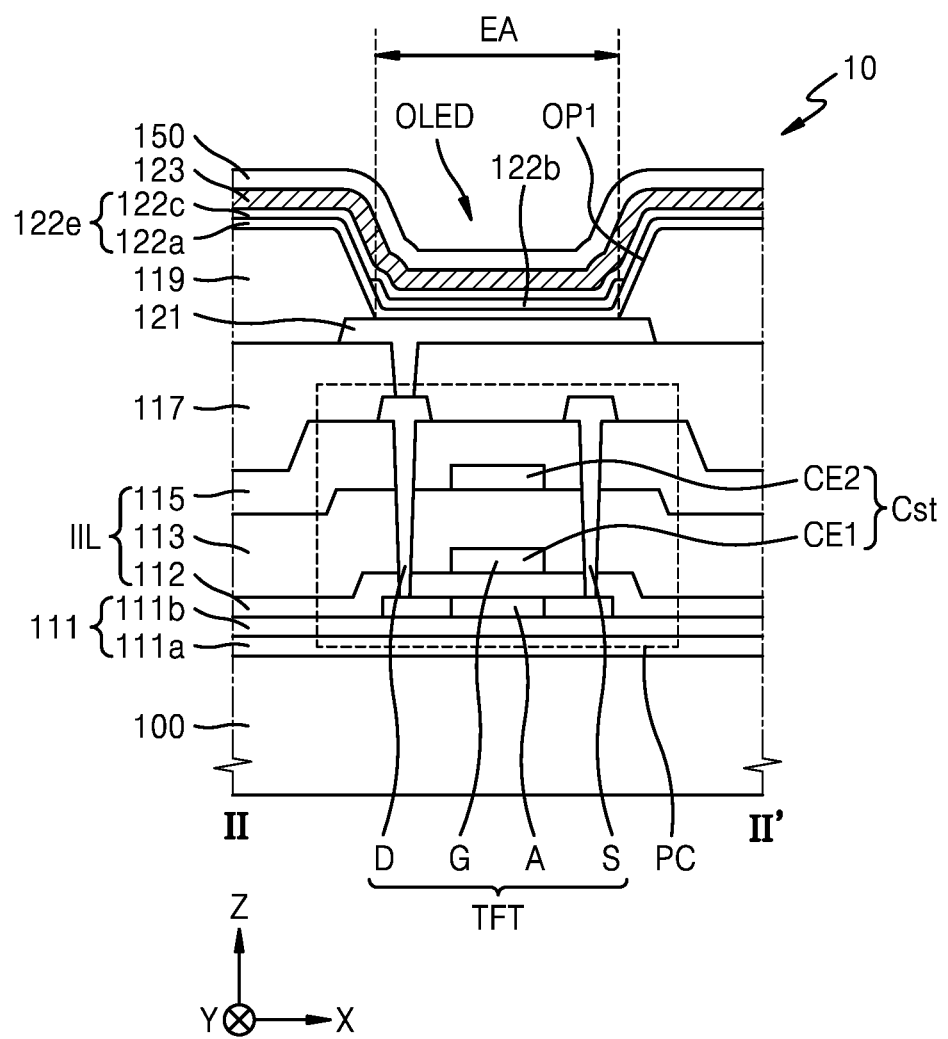
FIG. 10 is a schematic cross-sectional view of the display panel taken along line II-II' of FIG. 9.

FIG. 9 is a plan view schematically illustrating a display panel included in a display apparatus according to an embodiment. FIG. 10 is a schematic cross-sectional view of the display panel taken along line II-II' of FIG. 9.

Referring to FIGS. 9 and 10, the display panel 10 may include the display area DA and the peripheral area DPA outside of or adjacent to the display area DA. The display panel 10 may provide an image by using pixels P arranged or disposed in the display area DA.

The pixels P may be implemented as a display element such as an organic light-emitting diode OLED. Each pixel P may emit, for example, light of a red color, a green color, a blue color or a white color. The display area DA may be covered or overlapped using an encapsulation member to be protected from external air or moisture or the like within the spirit and the scope of the disclosure.

A first flexible film 14 may be attached to a boundary at one or a side of the display panel 10. One or a side of the first flexible film 14 may be attached to the boundary at the one side of the display panel 10 by using an anisotropic conductive film. The first flexible film 14 may be a bendable flexible film.

A display driver 12 may be arranged or disposed on the first flexible film 14. The display driver 12 may receive control signals and power voltages, and may generate signals and voltages for driving the display panel 10 and output the same. The display driver 12 may be formed using an integrated circuit (IC).

A display circuit board 11 may be attached or disposed to the other or another side of the first flexible film 14. The other side of the first flexible film 14 may be attached to an upper surface of the display circuit board 11 by using an anisotropic conductive film. The display circuit board 11 may be a flexible printed circuit board (FPCB) that may be bendable, a rigid PCB that may be rigid and not easily bendable, or a complex PCB including both a rigid PCB and a flexible FPCB.

A touch sensor driver 13 may be arranged or disposed on the display circuit board 11. The touch sensor driver 13 may be formed using an IC. The touch sensor driver 13 may be attached to the display circuit board 11. The touch sensor driver 13 may be electrically connected to touch electrodes of a touch screen layer 400 (FIG. 11) of the display panel 10 via the display circuit board 11.

The touch screen layer of the display panel 10 may detect a touch input by a user by using at least one of various touch methods such as a resistive film type method, a capacitive type method, and the like within the spirit and the scope of the disclosure. For example, in a case that the touch screen layer of the display panel 10 detects a touch input by a user by using a capacitive method, the touch sensor driver 13 may apply driving signals to driving electrodes among the touch electrodes. Then, whether the user has touched or not may be determined by detecting voltages charged in mutual capacitance between the driving electrodes and sensing electrodes, by using the sensing electrodes from among the touch electrodes. A touch by a user may include a contact touch and a proximity touch. A contact touch may refer to a direct contact by a user's finger or an object such as a pen, on the cover window 700 arranged or disposed on the touch screen layer. Like hovering, a proximity touch may refer to an approach by the finger of a user or an object such as a pen in proximity to the cover window 700. The touch sensor driver 13 may transmit sensor data to a main processor based on the detected voltages, and by analyzing the sensor data, the main processor may calculate touch coordinates where a touch input has occurred.

A power supply unit for supplying driving voltages to drive the pixels P of the display panel 10, a scan driver, and the display driver 12 may be further arranged or disposed on the display circuit board 11. Alternatively, the power supply unit may be combined with the display driver 12, and as an example, the display driver 12 and the power supply unit may be formed using a single IC.

A substrate 100 may include an insulating material such as glass, quartz, a polymer resin, or the like within the spirit and the scope of the disclosure. For example, the substrate 100 may include a polymer resin such as polyethersulfone, polyacrylate, polyetherimide, polyethylene naphthalate, polyethylene terephthalate, polyphenylene sulfide, polyarylate, PI, polycarbonate or cellulose acetate propionate. The substrate 100 may have a multi-layer structure including a layer including the above-described polymer resin and an inorganic layer (not shown). For example, the substrate 100 may include two layers including the above-described polymer resin and an inorganic barrier layer therebetween. The substrate 100 may be a rigid substrate or a flexible substrate that may be bendable, foldable, or rollable.

A buffer layer 111 may be located or disposed on the substrate 100 and reduce or prevent penetration of foreign substances, moisture, or external air from below the substrate 100 and provide a flat surface on the substrate 100. The buffer layer 111 may include an inorganic material such as an oxide or nitride, an organic material, or an organic-inorganic composite material, and may have a single-layer or multi-layer structure of an inorganic material and an organic material. A barrier layer (not shown) blocking penetration of outside air may be further included between the substrate 100 and the buffer layer 111. In an embodiment, the buffer layer 111 may be formed of silicon oxide ($SiO_2$) or silicon nitride ($SiN_x$). The buffer layer 111 may include a first buffer layer 111*a* and a second buffer layer 111*b* that may be stacked. In this case, the first buffer layer 111*a* may include silicon oxide ($SiO_2$), and the second buffer layer 111*b* may include silicon nitride ($SiN_x$). Alternatively, the first buffer layer 111*a* may include silicon nitride ($SiN_x$), and the second buffer layer 111*b* may include silicon oxide ($SiO_2$). Alternatively, the first buffer layer 111*a* and the second buffer layer 111*b* may include a same or similar material.

A pixel circuit PC may be arranged or disposed on the buffer layer 111. The pixel circuit PC may include a thin film transistor TFT and a storage capacitor Cst. The thin film transistor TFT may be arranged or disposed on the buffer layer 111. The thin film transistor TFT may include a semiconductor layer A, a gate electrode G, a source electrode S, and a drain electrode D. The thin film transistor TFT may be electrically connected to an organic light-emitting diode OLED to drive the organic light-emitting diode OLED.

The semiconductor layer A may be arranged or disposed on the buffer layer 111 and may include polysilicon. In an embodiment, the semiconductor layer A may include amorphous silicon. In an embodiment, the semiconductor layer A may include an oxide of at least one material selected from the group including indium (In), gallium (Ga), stannum (Sn), zirconium (Zr), vanadium (V), hafnium (Hf), cadmium (Cd), germanium (Ge), chromium (Cr), titanium (Ti), and zinc (Zn). The semiconductor layer A may include a channel area and a source area and a drain area that may be doped with impurities.

A first insulating layer 112 may be included to cover or overlap the semiconductor layer A. The first insulating layer 112 may include an inorganic insulating material such as silicon oxide ($SiO_X$), silicon nitride ($SiN_X$), silicon oxynitride ($SiO_XN_Y$), aluminum oxide ($Al_2O_3$), titanium oxide ($TiO_2$), tantalum oxide ($Ta_2O_5$), hafnium oxide ($HfO_2$), zinc oxide ($ZnO_2$), or the like within the spirit and the scope of the disclosure. The first insulating layer 112 may be a single layer or multiple layers including the above-described inorganic insulating materials.

The gate electrode G may be arranged or disposed on the first insulating layer 112 to overlap the semiconductor layer A. The gate electrode G may include molybdenum (Mo), aluminum (Al), copper (Cu), titanium (Ti), and the like, and may include a single layer or multiple layers. In an embodiment, the gate electrode G may be a single layer of molybdenum (Mo).

The second insulating layer 113 may cover or overlap the gate electrode G. The second insulating layer 113 may include an inorganic insulating material such as silicon oxide ($SiO_X$), silicon nitride ($SiN_X$), silicon oxynitride ($SiO_XN_Y$), aluminum oxide ($Al_2O_3$), titanium oxide ($TiO_2$), tantalum oxide ($Ta_2O_5$), hafnium oxide ($HfO_2$), zinc oxide ($ZnO_2$), or the like within the spirit and the scope of the disclosure. The second insulating layer 113 may be a single layer or multiple layers including the above-described inorganic insulating materials.

An upper electrode CE2 of the storage capacitor Cst may be arranged or disposed on the second insulating layer 113. The upper electrode CE2 arranged or disposed on the second insulating layer 113 may overlap the gate electrode G arranged or disposed under or below the second insulating layer 113. The gate electrode G and the upper electrode CE2 overlapping each other with the second insulating layer 113 therebetween may form the storage capacitor Cst. In an embodiment, the gate electrode G may be a lower electrode CE1 of the storage capacitor Cst. In an embodiment, the lower electrode CE1 of the storage capacitor Cst may be included as an independent component. In this case, the lower electrode CE1 and the gate electrode G may be spaced apart from each other by a certain or predetermined distance.

The upper electrode CE2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu), and may include a single layer or multiple layers including the above-described materials.

A third insulating layer 115 may cover or overlap the upper electrode CE2. The third insulating layer 115 may include an inorganic insulating material such as silicon oxide ($SiO_X$), silicon nitride ($SiN_X$), silicon oxynitride ($SiO_XN_Y$), aluminum oxide ($Al_2O_3$), titanium oxide ($TiO_2$), tantalum oxide ($Ta_2O_5$), hafnium oxide ($HfO_2$), zinc oxide ($ZnO_2$), or the like within the spirit and the scope of the disclosure. The third insulating layer 115 may include a single layer or multiple layers including the above-described inorganic insulating materials. The first insulating layer 112, the second insulating layer 113, and the third insulating layer 115 may be collectively be referred to as insulating layers IIL.

A source electrode S and a drain electrode D may be arranged or disposed on the third insulating layer 115. The source electrode S and the drain electrode D may include a conductive material including molybdenum (Mo), aluminum (Al), copper (Cu), titanium (Ti), and the like, and may be formed as a multi-layer or single-layer structure including the above materials. In an embodiment, the source electrode S and the drain electrode D may have a multi-layer structure including titanium (Ti)/aluminum (Al)/titanium (Ti).

A planarization layer 117 may be arranged or disposed on the source electrode S and the drain electrode D. The planarization layer 117 may have a flat upper surface such that a pixel electrode 121 arranged or disposed thereon may be flat.

The planarization layer 117 may include an organic material or an inorganic material and may have a single-layer structure or a multi-layer structure. The planarization layer 117 may include a general-purpose polymer such as benzocyclobutene (BCB), PI, hexamethyldisiloxane (HMDSO), polymethylmethacrylate (PMMA), or polystyrene (PS), a polymer derivative having a phenolic group, acrylic polymer, imide-based polymer, aryl ether-based polymer, amide-based polymer, fluorine-based polymer, p-xylene-based polymer, or vinyl alcohol-based polymer. The planarization layer 117 may include an inorganic insulating material such as silicon oxide ($SiO_X$), silicon nitride ($SiN_X$), silicon oxynitride ($SiO_XN_Y$), aluminum oxide ($Al_2O_3$), titanium oxide ($TiO_2$), tantalum oxide ($Ta_2O_5$), hafnium oxide ($HfO_2$), zinc oxide ($ZnO_2$), or the like within the spirit and the scope of the disclosure. In a case that forming the planarization layer 117, in order to provide a flat upper surface after forming the planarization layer 117, chemical mechanical polishing may be performed on the upper surface thereof.

The planarization layer 117 may have a via hole exposing one of the source electrode S and the drain electrode D of the thin film transistor TFT, and the pixel electrode 121 may electrically contact the source electrode S or the drain electrode D via the via hole to be electrically connected to the thin film transistor TFT.

While one planarization layer is illustrated in FIG. 10, in an embodiment, two planarization layers may also be included. Two planarization layers may be more advantageous in terms of a higher level of integration.

The pixel electrode 121 may be arranged or disposed on the planarization layer 117. The pixel electrode 121 may include a conductive oxide such as indium tin oxide (ITO), indium zinc oxide (IZO), zinc oxide (ZnO), indium oxide ($In_2O_3$), indium gallium oxide (IGO) or aluminum zinc oxide (AZO). The pixel electrode 121 may include a reflective layer including silver (Ag), magnesium (Mg), aluminum (Al), platinum (Pt), palladium (Pd), gold (Au), nickel (Ni), neodymium (Nd), iridium (Ir), chromium (Cr), or a compound thereof. For example, the pixel electrode 121 may have a structure in which layers including ITO, IZO, ZnO or $In_2O_3$ may be above or below the above-described reflective layer. The pixel electrode 121 may have a structure in which indium tin oxide (ITO)/silver (Ag)/indium tin oxide (ITO) may be stacked.

A pixel defining layer 119 may be arranged or disposed on the planarization layer 117. The pixel defining layer 119 may be arranged or disposed on the planarization layer 117 and cover or overlap edges of the pixel electrode 121. In the pixel defining layer 119, a first opening OP1 exposing at least a portion of the pixel electrode 121 may be defined or formed. An emission area EA of the organic light-emitting diode OLED, for example, a size and shape of a pixel P may be defined or formed by the first opening OP1.

The pixel defining layer 119 may increase a distance between the edges of the pixel electrode 121 and an opposite electrode 123 above the pixel electrode 121 to thereby prevent an arc or the like at the edges of the pixel electrode 121. The pixel defining layer 119 may include, for example, an organic insulating material such as PI, polyamide, an acrylic resin, benzocylcobutene, HMDSO, a phenolic resin, or the like, and may be formed by spin coating or the like within the spirit and the scope of the disclosure.

Although not illustrated, a spacer to prevent mask stamping may be further arranged or disposed on the pixel defining layer 119. The spacer may be formed as a single body with the pixel defining layer 119. For example, the spacer and the pixel defining layer 119 may be simultaneously formed in a same process by using a halftone mask process.

An emission layer 122b may be arranged or disposed in the first opening OP1 defined or formed in the pixel defining layer 119, to correspond to the pixel electrode 121. The emission layer 122b may include a polymer material or a low-molecular material, and may emit light of red, green, blue or white color.

An organic functional layer 122e may be arranged or disposed on and/or under or below the emission layer 122b. In an embodiment, the organic functional layer 122e may include a first functional layer 122a and/or a second functional layer 122c. In an embodiment, the first functional layer 122a or the second functional layer 122c may be omitted.

The first functional layer 122a may be arranged or disposed under or below the emission layer 122b. The first functional layer 122a may have a single-layer or multi-layer structure including an organic material. The first functional layer 122a may be a hole transport layer (HTL) having a single-layer structure. Alternatively, the first functional layer 122a may include a hole injection layer (HIL) and a HTL. The first functional layer 122a may be formed as a single body to correspond to organic light-emitting diodes OLED included in the display area DA.

The second functional layer 122c may be arranged or disposed on the emission layer 122b. The second functional layer 122c may be a single layer or multiple layers including an organic material. The second functional layer 122c may include an electron transport layer (ETL) and/or an electron injection layer (EIL). The second functional layer 122c may be formed as a single body to correspond to organic light-emitting diodes OLED included in the display area DA.

The opposite electrode 123 may be arranged or disposed on the second functional layer 122c. The opposite electrode 123 may include a conductive material having a low work function. For example, the opposite electrode 123 may include a (semi)transparent layer including silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or an alloy thereof. Alternatively, the opposite electrode 123 may further include a layer such as ITO, IZO, ZnO or $In_2O_3$ on the (semi)transparent layer including the above-described materials. The opposite electrode 123 may be formed as a single body to correspond to organic light-emitting diodes OLED included in the display area DA.

The layers from the pixel electrode 121 to the opposite electrode 123 may constitute an organic light-emitting diode OLED.

An upper layer 150 including an organic material may be formed or disposed on the opposite electrode 123. The upper layer 150 may be provided to protect the opposite electrode 123 and also increase light extraction efficiency. The upper layer 150 may include an organic material having a higher refractive index than the opposite electrode 123. Alternatively, the upper layer 150 may include layers having different refractive indices and stacked on each other. For example, the upper layer 150 may be formed by stacking a high-refractive index layer/low-refractive index layer/high-refractive index layer. A refractive index of the high-refractive index layer may be about 1.7 or higher, and a refractive index of the low-refractive index layer may be about 1.3 or lower.

The upper layer 150 may further include LiF. Alternatively, the upper layer 150 may further include an inorganic insulating material such as silicon oxide ($SiO_2$) or silicon nitride ($SiN_X$). The upper layer 150 may be omitted. However, for convenience of description, description will focus on an embodiment in which the upper layer 150 may be arranged or disposed on the opposite electrode 123.

Figure 11:
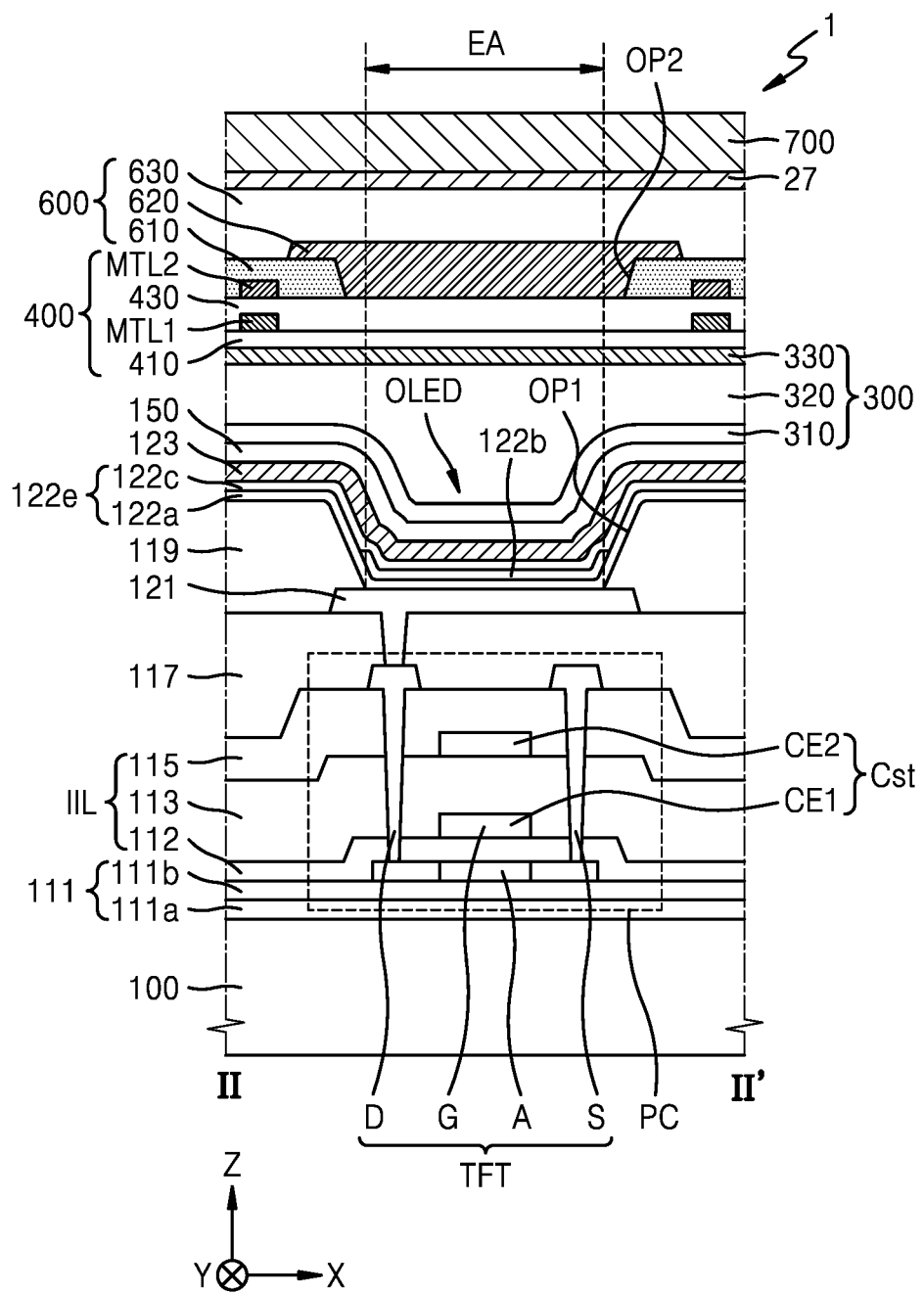
FIG. 11 is a schematic cross-sectional view schematically illustrating a display apparatus according to an embodiment.

FIG. 11 is a schematic cross-sectional view schematically illustrating a display apparatus according to an embodiment. In FIG. 11, like reference numerals as those in FIG. 10 denote like elements, and thus repeated description thereof will be omitted.

Referring to FIG. 11, a thin-film encapsulation layer 300 may be arranged or disposed on the organic light-emitting diode OLED. The thin-film encapsulation layer 300 may include at least one inorganic film layer and at least one organic film layer. For example, the thin-film encapsulation layer 300 may include a first inorganic film layer 310, an organic film layer 320, and a second inorganic film layer 330.

The first inorganic film layer 310 and the second inorganic film layer 330 may each include one or more inorganic insulating materials. The inorganic insulating material may include silicon oxide ($SiO_X$), silicon nitride ($SiN_X$), silicon oxynitride ($SiO_XN_Y$), aluminum oxide ($Al_2O_3$), titanium oxide ($TiO_2$), tantalum oxide ($Ta_2O_5$), hafnium oxide ($HfO_2$), zinc oxide ($ZnO_2$), or the like within the spirit and the scope of the disclosure.

The organic film layer 320 may include a polymer-based material. Examples of the polymer-based material may include an acrylic resin, an epoxy resin, PI, polyethylene, and the like within the spirit and the scope of the disclosure. For example, the organic film layer 320 may include an acrylic resin, such as polymethylmethacrylate, polyacrylic acid, and the like within the spirit and the scope of the disclosure. The organic film layer 320 may be formed by hardening a monomer or applying a polymer.

The touch screen layer 400 may be arranged or disposed on the thin-film encapsulation layer 300. The touch screen layer 400 may include a first conductive layer MTL1 and a second conductive layer MTL2 including a sensing electrode and/or a trace line or the like within the spirit and the scope of the disclosure. A first touch insulating layer 410 may be arranged or disposed between the thin-film encapsulation layer 300 and the first conductive layer MTL1, and a second touch insulating layer 430 may be arranged or disposed between the first conductive layer MTL1 and the second conductive layer MTL2.

The first conductive layer MTL1 and the second conductive layer MTL2 may include a conductive material. The conductive material may include molybdenum (Mo), aluminum (Al), copper (Cu), titanium (Ti), or the like, and may include multiple layers or a single layer including the above material. In an embodiment, the first conductive layer MTL1 and the second conductive layer MTL2 may have a structure in which a titanium layer, an aluminum layer, and a titanium layer may be sequentially stacked (Ti/Al/Ti).

The first touch insulating layer 410 and the second touch insulating layer 430 may include an inorganic insulating material and/or an organic insulating material. The inorganic insulating material may include silicon oxide ($SiO_x$), silicon nitride ($SiN_x$), silicon oxynitride ($SiO_xN_y$), aluminum oxide ($Al_2O_3$), titanium oxide ($TiO_2$), tantalum oxide ($Ta_2O_5$), hafnium oxide ($HfO_2$), zinc oxide ($ZnO_2$), or the like within the spirit and the scope of the disclosure. The organic insulating material may include an acrylic organic material, an imide organic material, or the like within the spirit and the scope of the disclosure.

A filter plate 600 may be arranged or disposed on the touch screen layer 400 as an optical functional layer. The filter plate 600 may include a black matrix 610, a color filter 620, and an overcoat layer 630.

The black matrix 610 may be located or disposed in a non-emission area around the emission area EA and surround the emission area EA. In an embodiment, the black matrix 610 may passivate a touch electrode of the touch screen layer 400. For example, as illustrated in FIG. 11, the second conductive layer MTL2 of the touch screen layer 400 may overlap the black matrix 610, and the second conductive layer MTL2 may be covered or overlapped using the black matrix 610. The black matrix 610 may include an insulating material (for example, an organic insulating material) including a pigment or dye having a black color. The black matrix 610 may include a material that may be included in the pixel defining layer 119.

The black matrix 610 may have a second opening OP2 corresponding to the emission area EA. The second opening OP2 defined or formed in the black matrix 610 may be formed to be the same in size as or larger than the first opening OP1 defined or formed in the pixel defining layer 119.

The color filter 620 may be arranged or disposed in the emission area EA of the organic light-emitting diode OLED. The color filter 620 may have a red, green, or blue pigment or dye according to a color of light emitted from the organic light-emitting diode OLED.

The overcoat layer 630 covering or overlapping the black matrix 610 and the color filter 620 to planarize an upper surface of the filter plate 600 may be arranged or disposed on the black matrix 610 and the color filter 620.

Although not illustrated, in an embodiment, instead of the filter plate 600, an optical functional layer including a polarization plate may be arranged or disposed on the touch screen layer 400. In this case, the optical functional layer may include an anti-reflection layer. The anti-reflection layer may reduce a reflectance of light (external light) incident from the outside to the display apparatus 1.

In an embodiment, the anti-reflection layer may include a polarization film. The polarization film may include a linear polarization plate and a phase delay film such as a quarter-wave ($\lambda/4$) plate. The phase delay film may be arranged or disposed on the touch screen layer 400, and a linear polarization plate may be arranged or disposed on the phase delay film. In an embodiment, the anti-reflection layer may include a destructive interference structure. The destructive interference structure may include a first reflective layer and a second reflective layer arranged or disposed on different layers from each other. First reflected light and second reflected light respectively reflected by the first reflective layer and the second reflective layer may undergo destructive interference, thereby reducing external light reflectance.

The cover window 700 may be arranged or disposed above the filter plate 600. The cover window 700 may be attached to the filter plate 600 by using the sixth adhesive layer 27. The sixth adhesive layer 27 may be a PSA or an OCA.

In an embodiment, in the display apparatus 1 including the display area DA and the folding area FA, as the digitizer 40 may be arranged or disposed below the display panel 10, various input methods using a pen or the like may be provided to users.

In an embodiment, as the sagging prevention member 80 may be arranged or disposed to correspond to the folding area FA, and a digitizer (for example, the third digitizer 40c) may be arranged or disposed above the sagging prevention member 80, various input methods using a pen or the like may be provided to users in the folding area FA.

For example, in an embodiment, as a folding structure may be included in the second portion 30b of the plate 30 arranged or disposed below the display panel 10, the second portion 30b corresponding to the folding area FA, in-folding may be easily implemented.

According to an embodiment as described above, as a digitizer may be included below a foldable display panel that may be folded or unfolded, various input methods using a pen or the like may be provided to users. However, the scope of the disclosure is not limited by the above-described effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
   a display area and a folding area;
   a display panel;
   a digitizer disposed below the display panel;
   a sagging prevention member disposed in a portion below the display panel, a center of the sagging prevention member overlapping the folding area; and
   a lower cover disposed below the sagging prevention member.

2. The display apparatus of claim 1, wherein an entirety of the sagging prevention member overlaps the folding area.

3. The display apparatus of claim 1, wherein the sagging prevention member is moveable relative to a portion of the display panel directly above the sagging prevention member.

4. A display apparatus comprising:
   a display area and a folding area;
   a display panel;
   a digitizer disposed below the display panel;
   a sagging prevention member disposed in a portion below the display panel overlapping the folding area; and
   a lower cover disposed below the sagging prevention member, wherein the display area includes a first display area and a second display area spaced apart from each other,
the folding area is disposed between the first display area and the second display area, and
the digitizer includes:
a first digitizer overlapping the first display area;
a second digitizer overlapping the second display area; and
a third digitizer overlapping the folding area.

5. The display apparatus of claim 4, wherein the first digitizer and the second digitizer are spaced apart from each other.

6. The display apparatus of claim 5, wherein the third digitizer is disposed between the first digitizer and the second digitizer.

7. The display apparatus of claim 6, wherein the third digitizer is spaced apart from each of the first digitizer and the second digitizer.

8. The display apparatus of claim 7, wherein the third digitizer is disposed above the sagging prevention member.

9. The display apparatus of claim 8, further comprising an electromagnetic wave absorption layer disposed below the digitizer.

10. The display apparatus of claim 9, wherein the electromagnetic wave absorption layer includes:
a first electromagnetic wave absorption layer overlapping the first display area;
a second electromagnetic wave absorption layer overlapping the second display area; and
a third electromagnetic wave absorption layer overlapping the folding area.

11. The display apparatus of claim 10, wherein the first electromagnetic wave absorption layer, the second electromagnetic wave absorption layer, and the third electromagnetic wave absorption layer are spaced apart from one another.

12. The display apparatus of claim 10, wherein the third electromagnetic wave absorption layer is disposed between the sagging prevention member and the third digitizer.

13. The display apparatus of claim 10, further comprising a wing plate disposed below the electromagnetic wave absorption layer.

14. The display apparatus of claim 13, wherein the wing plate includes:
a first wing plate overlapping the first display area; and
a second wing plate overlapping the second display area.

15. The display apparatus of claim 14, wherein the first wing plate and the second wing plate are spaced apart from each other.

16. The display apparatus of claim 15, wherein the sagging prevention member is disposed between the first wing plate and the second wing plate.

17. The display apparatus of claim 16, further comprising an optical functional layer disposed above the display panel.

18. The display apparatus of claim 4, further comprising a plate disposed between the display panel and the digitizer.

19. The display apparatus of claim 18, wherein the plate includes:
a first portion overlapping the first display area and the second display area; and
a second portion overlapping the folding area.

20. The display apparatus of claim 19, wherein
the first portion of the plate includes a non-metallic material, and
the second portion of the plate includes a metallic material.

21. The display apparatus of claim 20, further comprising a folding structure disposed in the second portion of the plate.

22. A display apparatus comprising:
a display area and a folding area;
a display panel;
a plate disposed below the display panel and comprising:
a first portion overlapping the display area; and
a second portion overlapping the folding area;
a digitizer disposed below the plate; and
a sagging prevention member disposed below the plate overlapping the folding area.

23. The display apparatus of claim 22, wherein the first portion of the plate and the second portion of the plate include different materials.

24. The display apparatus of claim 23, wherein
the display area includes a first display area and a second display area spaced apart from each other,
the folding area is disposed between the first display area and the second display area, and
the digitizer includes:
a first digitizer overlapping the first display area;
a second digitizer overlapping the second display area; and
a third digitizer overlapping the folding area.

25. The display apparatus of claim 24, wherein
the first digitizer and the second digitizer overlap the first portion of the plate, and
the third digitizer overlaps the second portion of the plate.

26. The display apparatus of claim 25, wherein the third digitizer is disposed above the sagging prevention member.

27. The display apparatus of claim 26, further comprising a wing plate disposed below the digitizer,
wherein the wing plate includes:
a first wing plate overlapping the first display area; and
a second wing plate overlapping the second display area.

28. The display apparatus of claim 27, wherein the first wing plate and the second wing plate are spaced apart from each other.

29. The display apparatus of claim 28, wherein the sagging prevention member is disposed between the first wing plate and the second wing plate.

30. The display apparatus of claim 27, further comprising a cushion layer disposed above the wing plate,
wherein the cushion layer includes:
a first cushion layer overlapping the first display area; and
a second cushion layer overlapping the second display area.

31. The display apparatus of claim 30, wherein the first cushion layer and the second cushion layer are spaced apart from each other.

32. The display apparatus of claim 31, wherein the sagging prevention member is disposed between the first cushion layer and the second cushion layer.

* * * * *